US012797801B2

(12) United States Patent
Gronwald et al.

(10) Patent No.: US 12,797,801 B2

(45) Date of Patent: Nov. 17, 2026

(54) MEMBRANE (M) COMPRISING A SULFONATED POLY(ARYLENE ETHER SULFONE) POLYMER (sP) AND A NON-SULFONATED POLY(ARYLENE SULFONE) POLYMER (P)

(71) Applicant: BASF SE, Ludwigshafen am Rhein (DE)

(72) Inventors: Oliver Gronwald, Ludwigshafen am Rhein (DE); Martin Weber, Ludwigshafen am Rhein (DE); Christian Maletzko, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 328 days.

(21) Appl. No.: 18/698,032

(22) PCT Filed: Sep. 30, 2022

(86) PCT No.: PCT/EP2022/077394

§ 371 (c)(1),
(2) Date: Apr. 3, 2024

(87) PCT Pub. No.: WO2023/057352

PCT Pub. Date: Apr. 13, 2023

(65) Prior Publication Data

US 2024/0399314 A1 Dec. 5, 2024

(30) Foreign Application Priority Data

Oct. 5, 2021 (EP) .................................... 21201017

(51) Int. Cl.

*B01D 61/02* (2006.01)
*B01D 67/00* (2006.01)

(Continued)

(52) U.S. Cl.

CPC ......... *B01D 67/003* (2013.01); *B01D 61/027* (2013.01); *B01D 67/0011* (2013.01);

(Continued)

(58) Field of Classification Search

CPC ...... B01D 61/027; B01D 69/02; B01D 71/68; B01D 2325/20

See application file for complete search history.

(56) References Cited

U.S. PATENT DOCUMENTS

| | | | |
|---|---|---|---|
| 5,246,582 | A | 9/1993 | Sluma et al. |
| 2008/0241626 | A1 | 10/2008 | Kim et al. |

OTHER PUBLICATIONS

Hwang, Hae Young, et al. "PES/SPAES blend membranes for nanofiltration: the effects of sulfonic acid groups and thermal treatment." Desalination 289 (2012): 72-80. (Year: 2012).*

(Continued)

*Primary Examiner* — Bradley R Spies

(74) *Attorney, Agent, or Firm* — Faegre Drinker Biddle & Reath LLP

(57) ABSTRACT

The present invention relates to a membrane (M) comprising a sulfonated poly(arylene ether sulfone) polymer (sP) and a non-sulfonated poly(arylene sulfone) polymer (P), to a method for the preparation of the membrane (M) and to the use of the membrane as nanofiltration membrane. Further, the present invention relates to a monolithic film (F) comprising a sulfonated poly(arylene ether sulfone) polymer (sP) and a non-sulfonated poly(arylene sulfone) polymer (P), wherein the monolithic film has a contact angle of 63 to 77°.

5 Claims, 1 Drawing Sheet

(51) Int. Cl.
*B01D 69/02* (2006.01)
*B01D 71/68* (2006.01)

(52) U.S. Cl.
CPC ......... *B01D 67/0013* (2013.01); *B01D 69/02* (2013.01); *B01D 71/68* (2013.01); *B01D 2323/081* (2022.08); *B01D 2325/022* (2013.01); *B01D 2325/02831* (2022.08); *B01D 2325/02832* (2022.08)

(56) References Cited

OTHER PUBLICATIONS

International Search Report and Written Opinion received for PCT Patent Application No. PCT/EP2022/077394, mailed on Jan. 3, 2023, 17 pages.

Lee et al., "Disulfonated poly(arylene ether sulfone) random copolymer thin film composite membrane fabricated using a benign solvent for reverse osmosis applications", Journal of Membrane Science, vol. 389, No. 1, Feb. 1, 2012, pp. 363-371.

* cited by examiner

MEMBRANE (M) COMPRISING A SULFONATED POLY(ARYLENE ETHER SULFONE) POLYMER (sP) AND A NON-SULFONATED POLY(ARYLENE SULFONE) POLYMER (P)

CROSS-REFERENCE TO RELATED APPLICATIONS

This application is a National stage application (under 35 U.S.C. § 371) of PCT/EP2022/077394, filed Sep. 30, 2022, which claims benefit of European Application No. 21201017.7, filed Oct. 5, 2021, both of which are incorporated herein by reference in their entirety.

The present invention relates to a membrane (M) comprising a sulfonated poly(arylene ether sulfone) polymer (sP) and a non-sulfonated poly(arylene sulfone) polymer (P), to a method for the preparation of the membrane (M) and to the use of the membrane as nanofiltration membrane. Further, the present invention relates to a monolithic film (F) comprising a sulfonated poly(arylene ether sulfone) polymer (sP) and a non-sulfonated poly(arylene sulfone) polymer (P), wherein the monolithic film has a contact angle of 63 to 77°.

Poly(arylene ether sulfone) polymers are high-performance thermoplastics in that they feature high heat resistance, good mechanical properties and inherent flame retardancy (E. M. Koch, H.-M. Walter, *Kunststoffe* 80 (1990) 1146; E. Döring, *Kunststoffe* 80, (1990) 1149, N. Inchaurondo-Nehm, *Kunststoffe* 98, (2008) 190). They are highly biocompatible and so are used as material for forming dialysis membranes (N. A. Hoenich, K. P. Katapodis, *Biomaterials* 23 (2002) 3853) and ultrafiltration (UF) membranes. Ultrafiltration membranes (UF) are supposed to have an active filtration layer possessing a molecular weight cut-off from 10 to 100 kDa corresponding to 10 to 30 nm pore size to remove yeast, bacteria, virus and macromolecules efficiently from water. As an elevated hydrophilicity of membranes is considered to prevent performance losses by fouling effects (D. Raana et al. “Surface modifications for antifouling membranes”, Chemical Reviews, 2010, 110, 2448), sulfonated poly(arylene sulfone) polymers are also considered for membrane applications.

In the article “Effect of Molecular Weight of Sulfonated Poly(ether sulfone) (SPES) on the Mechanical Strength and Antifouling Properties of Poly(ether sulfone)/SPES Blend Membranes” by L.-F. Fang et al. (Ind. Eng. Chem. Res., 2017, 56, 11302), the effect of molecular weights of sulfonated poly(ether sulfone) on the performance of a poly(ether sulfone)/SPES blend membrane is investigated. With the increase of molecular weight of SPES, the mechanical strength of the membranes is increased. The hydrophilicity and the negative charge density of the membranes are also increased by blending SPES. The improved surface hydrophilicity and negative charge led to enhanced antifouling properties of the blend membranes.

U.S. Pat. No. 5,246,582 A discloses a synthetic hydrophilic membrane, and method for manufacturing thereof, in the form of hollow fibers or flat membranes for dialysis and/or ultrafiltration, containing a mixture of polysulfone and sulfonated polysulfone, the mixture containing 65 to 95 wt. % sulfonated polysulfone, possibly as a salt of sulfonic acid, and 35 to 5 wt. % unsulfonated polysulfone.

US 2008/0241626 A1 discloses polymer blend membranes of sulfonated and nonsulfonated polysulfones, methods for the preparation the membrane, and fuel cells comprising the same.

In the article “Disulfonated poly(arylene ether sulfone) random copolymer thin film composite membrane fabricated using a benign solvent for reverse osmosis applications” by Chang Hyun Lee et al (*Journal of Membrane Science,* 2011, 389, 363), disulfonated poly(arylene ether sulfone) random copolymer thin film composite membranes, fabricated using a benign solvent for reverse osmosis application, are investigated.

However, it has not yet been possible to produce nanofiltration membranes from poly(arylene sulfone) polymers that have a low molecular weight cut-off and high water permeation at the same time.

The object of the present invention therefore was to provide an improved membrane, which exhibits an increased selectivity without significantly reducing the high membrane productivity. The membrane should also show good mechanical properties. The method for the preparation of the membrane should be easy to perform at relatively low costs.

This object is achieved by a membrane (M) comprising (A) a sulfonated poly(arylene ether sulfone) polymer (sP) and (B) a non-sulfonated poly(arylene sulfone) polymer (P).

This object is further achieved by a membrane (M) comprising (A) a sulfonated poly(arylene ether sulfone) polymer (sP) and (B) a non-sulfonated poly(arylene sulfone) polymer (P), wherein the membrane (M) has a minimal pore diameter of <5 nm and a pure water permeation of >50 kg/(h $m^2$ bar) and wherein the membrane (M) is used as nanofiltration membrane.

It has surprisingly been found that the inventive membrane (M) comprising a sulfonated poly(arylene ether sulfone) polymer (sP) and a non-sulfonated poly(arylene sulfone) polymer (P) can be successfully used as nanofiltration membrane. The membrane (M) has a minimal pore diameter <5 nm which corresponds to a rejection of <2 kDa with a high pure water permeation of >50 kg/(h $m^2$ bar) at the same time.

The present invention will be described in more detail hereinafter.

Membrane (M)

The membrane (M) comprises a sulfonated poly(arylene ether sulfone) polymer (sP) and a non-sulfonated poly (arylene sulfone) polymer (P).

Preferably, the membrane (M) comprises from 15 to 80% by weight, more preferably from 20 to 75% by weight, of the sulfonated poly(arylene ether sulfone) polymer (sP), based on the total weight of the membrane (M).

A further object of the present invention is therefore a membrane (M), wherein the membrane (M) comprises from 15 to 80% by weight of the sulfonated poly(arylene ether sulfone) polymer (sP), based on the total weight of the membrane (M).

The membrane (M) also preferably comprises from 20 to 85% by weight, more preferably from 25 to 80% by weight, of the non-sulfonated poly(arylene sulfone) polymer (P), based on the total weight of the membrane (M).

Therefore, in a preferred embodiment, the membrane (M) comprises from 15 to 80% by weight of the sulfonated poly(arylene ether sulfone) polymer (sP) and from 20 to 85% by weight of the non-sulfonated poly(arylene sulfone) polymer (P), based in each case on the total weight of the membrane (M).

In a more preferred embodiment, the membrane (M) comprises from 20 to 75% by weight of the sulfonated poly(arylene ether sulfone) polymer (sP) and from 25 to 80% by weight of the non-sulfonated poly(arylene sulfone) polymer (P), based in each case on the total weight of the membrane (M).

The membrane (M) preferably has a pure water permeation of >50 kg/(h $m^2$ bar), determined using a pressure cell with a diameter of 74 mm using ultrapure water (salt-free water, filtered by a Millipore UF-system) at 23° C. and 1 bar water pressure. The pure water permeation (PWP) is calculated as follows (equation (1)):

$$PWP = \frac{m}{A \times P \times t} \qquad (1)$$

PWP: pure water permeation [kg/bar h $m^2$]

m: mass of permeated water [kg]

A: membrane area [$m^2$]

P: pressure [bar]

t: time of the permeation experiment [h].

A further object of the present invention is therefore a membrane (M), wherein the membrane (M) has a pure water permeation of >50 kg/h $m^2$ bar.

The membrane (M) preferably has a surface area of >30 $m^2$/g, determined by gas-adsorption-desorption (GAD) experiments with nitrogen using the Brunauer-Emmet-Teller (BET) surface model.

A further object of the present invention is therefore a membrane (M), wherein the membrane (M) has a surface area of >30 $m^2$/g.

Component (A)

The membrane (M) comprises as component (A) a sulfonated poly(arylene ether sulfone) polymer (sP). In the present case the terms "a sulfonated poly(arylene ether sulfone) polymer (sP)" and "component (A)" are used synonymously and therefore have the same meaning.

The term "a sulfonated poly(arylene ether sulfone) polymer (sP)" in the present case, is understood to mean exactly one sulfonated poly(arylene ether sulfone) polymer (sP) and also mixtures of two or more sulfonated poly(arylene ether sulfone) polymers (sP).

In a preferred embodiment, the sulfonated poly(arylene ether sulfone) polymer (sP) comprises units of formula (I)

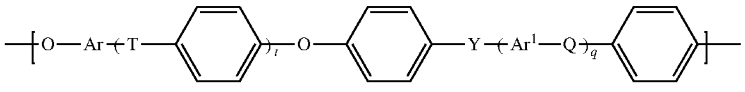

(I)

where t and q: are each independently 0, 1, 2 or 3,

Q, T and Y: are each independently a chemical bond or a group selected from —O—, —S—, —$SO_2$—, —S(═O)—, —(C═O)—, —N═N— and —$CR^aR^b$—, wherein $R^a$ and $R^b$ are each independently a hydrogen atom or a $C_1$-$C_{12}$ alkyl, $C_1$-$C_{12}$ alkoxy or $C_6$-$C_{18}$ aryl group, and where at least one of Q, T and Y is —$SO_2$— and Ar and $Ar^1$: are each independently an arylene group having from 6 to 18 carbon atoms and where at least one unit (I) comprises an arylene group which is substituted with at least one —$SO_2X$ group, wherein X is selected from the group consisting of Cl and $O^-$ combined with one cation equivalent, where the cation equivalent is $H^+$, $Li^+$, $Na^+$, $K^+$, $Mg^{2+}$, $Ca^{2+}$ or $NH_4^+$.

Another object of the present invention is therefore a membrane (M), wherein the sulfonated poly(arylene ether sulfone) polymer (sP) comprises units of formula (I)

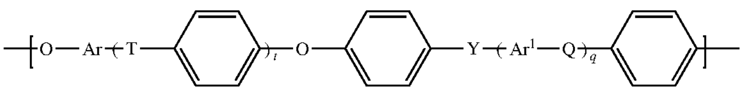

(I)

where t and q: are each independently 0, 1, 2 or 3,

Q, T and Y: are each independently a chemical bond or a group selected from —O—, —S—, —$SO_2$—, —S(═O)—, —(C═O)—, —N═N— and —$CR^aR^b$—, wherein $R^a$ and $R^b$ are each independently a hydrogen atom or a $C_1$-$C_{12}$ alkyl, $C_1$-$C_{12}$ alkoxy or $C_6$-$C_{18}$ aryl group, and where at least one of Q, T and Y is —$SO_2$— and Ar and $Ar^1$: are each independently an arylene group having from 6 to 18 carbon atoms and where at least one unit (I) comprises an arylene group which is substituted with at least one —$SO_2X$ group, wherein X is selected from the group consisting of Cl and $O^-$ combined with one cation equivalent, where the cation equivalent is $H^+$, $Li^+$, $Na^+$, $K^+$, $Mg^{2+}$, $Ca^{2+}$ or $NH_4^+$.

If Q, T or Y, among the abovementioned conditions, is a chemical bond, this is understood to mean that the adjacent group to the left and the adjacent group to the right are bonded directly to one another via a chemical bond. It will be readily appreciated that at least one of the groups consisting of Q, T and Y being —$SO_2$— means that at least one of Q, T and Y in formula (I) is —$SO_2$—. The consequence is, for example, that when q is =0, at least one of T and Y is —$SO_2$—; when, for example, t is =0, at least one of Q and Y is —$SO_2$— and when q=0 and t=0 then Y is $SO_2$.

If Q, T or Y is —$CR^aR^b$—, $R^a$ and $R^b$ are each independently a hydrogen atom or a $C_1$-$C_{12}$-alkyl, $C_1$-$C_{12}$-alkoxy or $C_6$-$C_{18}$-aryl group.

Preferred $C_1$-$C_{12}$-alkyl groups comprise linear and branched, saturated alkyl groups having from 1 to 12 carbon atoms. Particular mention should be made of the following radicals: $C_1$-$C_6$-alkyl radical such as methyl, ethyl, n-propyl, i-propyl, n-butyl, sec-butyl, 2- or 3-methylpentyl and longer-chain radicals such as unbranched heptyl, octyl, nonyl, decyl, undecyl, lauryl and the singly or multiply branched analogs thereof.

Useful alkyl radicals in the aforementioned usable $C_1$-$C_{12}$-alkoxy groups include the alkyl groups having from 1 to 12 carbon atoms defined above. Cycloalkyl radicals usable with preference comprise especially $C_3$-$C_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are each independently a $C_6$-$C_{18}$-arylene group. Proceeding from the starting materials described below, Ar is preferably derived from an electron-rich aromatic substance subject to easy electrophilic attack, preferably selected from the group consisting of hydroquinone, resorcinol, dihydroxynaphthalene, especially 2,7-dihydroxynaphthalene, and 4,4'-bisphenol. Preferably, $Ar^1$ is an unsubstituted $C_6$—or $C_{12}$-arylene group.

Useful $C_6$-$C_{18}$-arylene groups Ar and $Ar^1$ especially include phenylene groups such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and $Ar^1$ in the preferred embodiment of formula (I) are each independently selected from the group consisting of 1,4-phenylene, 1,3-phenylene, naphthylene, especially 2,7-dihydroxynaphthylene, and 4,4'-bisphenylene.

Preferred sulfonated poly(arylene ether sulfone) polymers (sP) are those comprising at least one of the following units Ia to Io as repeat structural units, wherein at least one unit (I) comprises an arylene group which is substituted with at least one —$SO_2X$ group, wherein X is selected from the group consisting of Cl and $O^-$ combined with one cation equivalent, where the cation equivalent is $H^+$, $Li^+$, $Na^+$, $K^+$, $Mg^{2+}$, $Ca^{2+}$ or $NH_4^+$:

Ia

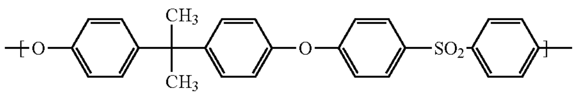

Ib

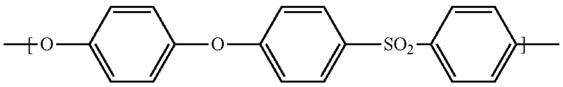

Ic

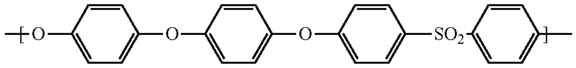

Id

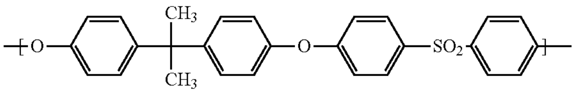

Ie

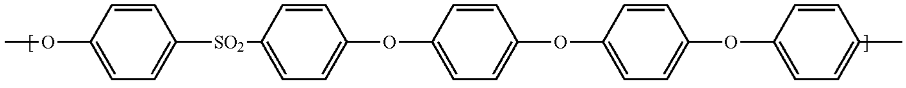

If

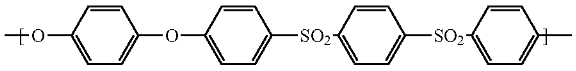

Ig

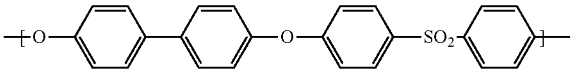

Ih

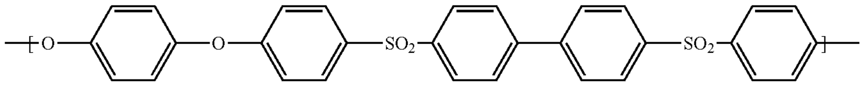

Ii

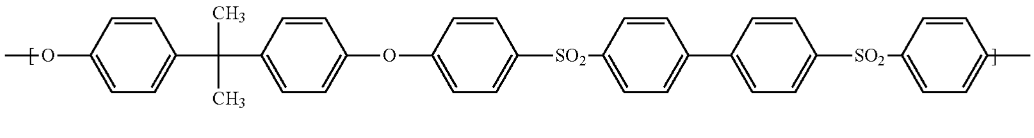

Ij

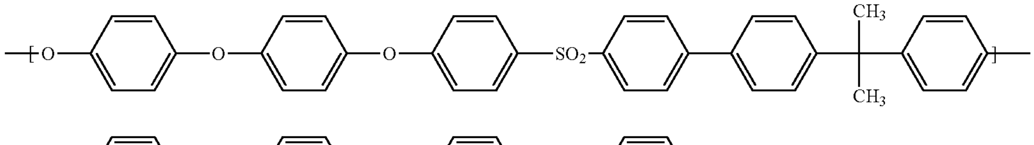

Ik

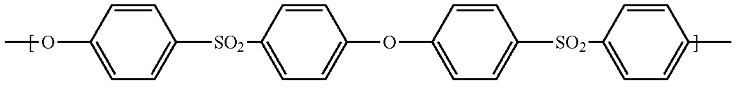

Il

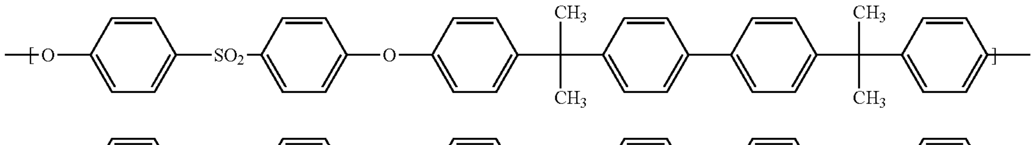

Im

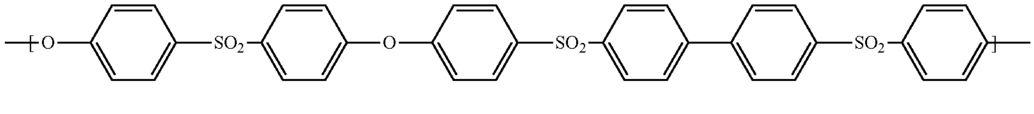

-continued

In

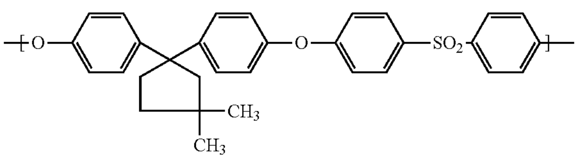

Io

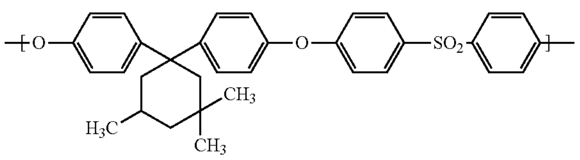

In addition to the preferred units Ia to Io, preference is also given to those units in which one or more 1,4-phenylene units which originate from hydroquinone are replaced by 1,3-phenylene units which originate from resorcinol or by naphthylene units which originate from dihydroxynaphthalene.

Particularly preferred units of the general formula (I) are the units Ia, Ig and Ik. It is also particularly preferred when the sulfonated poly(arylene ether sulfone) polymers of component (A) are formed essentially from one kind of units of the general formula (I), especially from a unit selected from Ia, Ig and Ik.

In a particularly preferred embodiment, Ar=1,4-phenylene, t=1, q=0, T is a chemical bond and Y$=$SO$_2$. Particularly preferred sulfonated poly(arylene ether sulfone) polymers (A) formed from the aforementioned repeat unit are referred to as sulfonated polyphenylene sulfone (PPSU) (formula Ig).

In a further particularly preferred embodiment, Ar=1,4-phenylene, t=1, q=0, T=C(CH$_3$)$_2$ and Y$=$SO$_2$. Particularly preferred sulfonated poly(arylene ether sulfone) polymers (A) formed from the aforementioned repeat unit are referred to as sulfonated polysulfone (PSU) (formula Ia).

In a further particularly preferred embodiment, Ar=1,4-phenylene, t=1, q=0, T=Y$=$SO$_2$. Particularly preferred sulfonated poly(arylene ether sulfone) polymers (A) formed from the aforementioned repeat unit are referred to as sulfonated poly(ether sulfone) (PESU) (formula Ik).

Abbreviations such as PPSU, PESU and PSU in the context of the present invention conform to DIN EN ISO 1043-1 (Plastics—Symbols and abbreviated terms—Part 1: Basic polymers and their special characteristics (ISO 1043-1:2001); German version EN ISO 1043-1:2002).

In a preferred embodiment, the sulfonated poly(arylene ether sulfone) polymer (sP) according to component (A) is a copolymer formed from poly(ether sulfone) (PESU) units and poly(phenylene sulfone) (PPSU) units, wherein at least one unit comprises an arylene group which is substituted with at least one —SO$_2$X group, wherein X is selected from the group consisting of Cl and O$^-$ combined with one cation equivalent, where the cation equivalent is H$^+$, Li$^+$, Na$^+$, K$^+$, Mg$^{2+}$, Ca$^{2+}$ or NH$_4^+$. This copolymer may, for example, be a random copolymer or a block copolymer. Preference is given to a random copolymer formed from poly(ether sulfone) (PESU) and poly(phenylene sulfone) (PPSU) for the reason that a more homogenous material is obtained which shows no or little phase separation in the dissolved or solid state.

In case the sulfonated poly(arylene ether sulfone) polymer (sP) according to component (A) is a copolymer formed from poly(ether sulfone) (PESU) units and poly(phenylene sulfone) (PPSU) units, the sulfonated poly(arylene ether sulfone) polymer (sP) comprises in the range from 1 to 20 mol % of poly(phenylene sulfone) (PPSU) units and from 80 to 99 mol % of poly(ether sulfone) (PESU) units, in each case based on the total sum of all repeating units of component (A).

In a particularly preferred embodiment, the sulfonated poly(arylene ether sulfone) polymer (sP) comprises units of formula (III)

(III)

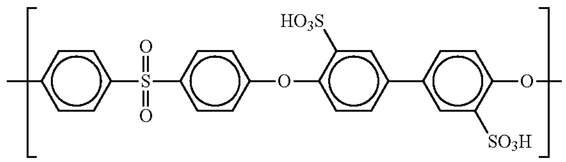

and/or formula (IV)

(IV)

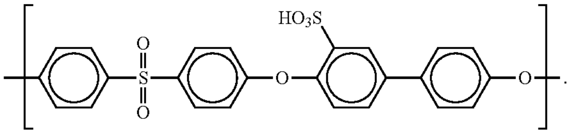

A further object of the present invention is therefore a membrane (M), wherein the sulfonated poly(arylene ether sulfone) polymer (sP) comprises units of formula (III)

(III)

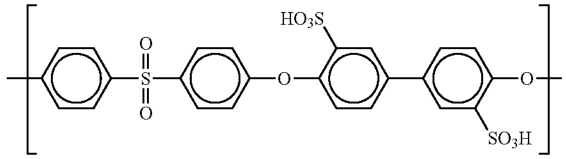

and/or formula (IV)

(IV)

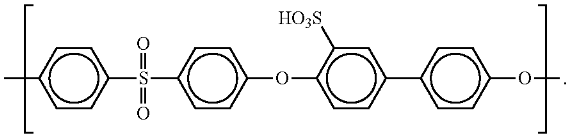

The sulfonated poly(arylene ether sulfone) polymer (sP) preferably has a number-average molecular weight (M$_N$) of from 10 000 to 35 000 g/mol, determined by gel permeation chromatography in dimethylacetamide as solvent versus narrowly distributed polymethyl methacrylate as standard.

A further object of the present invention is therefore a membrane (M), wherein the sulfonated poly(arylene ether sulfone) polymer (sP) has a number-average molecular weight ($M_N$) of from 10 000 to 35 000 g/mol.

In addition, the sulfonated poly(arylene ether sulfone) polymer (sP) preferably has a content of free acid of less than 3 mg KOH/g sulfonated poly(arylene ether sulfone) polymer (sP), determined by titration with 0.1 mol/I tetrabutylammoniumhydroxide solution (TBAH, in methanol/toluene) against a Solvotrode 30 electrode (Metrohm).

A further object of the present invention is therefore a membrane (M), wherein the sulfonated poly(arylene ether sulfone) polymer (sP) has a content of free acid of less than 3 mg KOH/g sulfonated poly(arylene ether sulfone) polymer (sP).

The sulfonated poly(arylene ether sulfone) polymer (sP) can be prepared by any method known to the person skilled in the art.

Preferably, the sulfonated poly(arylene ether sulfone) polymer (sP) is produced by treating a non-sulfonated poly(arylene ether sulfone) polymer with at least one sulfonating agent. The at least one sulfonating agent is suitably any compound known to a person skilled in the art that is capable of introducing at least one $SO_2X$ group, where X is Cl or $O^-$, combined with one cation equivalent, where the cation equivalent is $H^+$, $Li^+$, $Na^+$, $K^+$, $Mg^{2+}$, $Ca^{2+}$ or $NH_4^+$, into an aromatic ring of the non-sulfonated poly (arylene ether sulfone) polymer. The $SO_2X$ group is preferably a sulfonic acid group ($—SO_3H$) or a group capable of reacting with water to form a sulfonic acid group. Groups of this type are known to a person skilled in the art and include, for example, chlorosulfonyl groups ($—SO_2Cl$). The $SO_2X$ group is more preferably therefore a sulfonic acid group ($—SO_3H$) or a chlorosulfonyl group ($—SO_2Cl$), most preferably the $SO_2X$ group is a sulfonic acid group ($—SO_3H$).

The reaction of the non-sulfonated poly(arylene ether sulfone) polymer with the at least one sulfonating agent preferably sulfonates at least one of the aromatic rings of the non-sulfonated poly(arylene ether sulfone) polymer at least partially.

The mechanism of the sulfonation reaction is known as such to a person skilled in the art. Thereby it is particularly preferable for the sulfonation reaction to replace a hydrogen atom of the aromatic ring by a sulfonic acid group ($—SO_3H$).

Typically, from 0.001 to 1, preferably from 0.005 to 0.1 and more preferably from 0.01 to 0.08 $SO_2X$ groups per aromatic ring is introduced into the non-sulfonated poly (arylene ether sulfone) polymer. The sulfonated poly (arylene ether sulfone) polymer (sP) therefore typically has from 0.001 to 1, preferably from 0.005 to 0.1, and more preferably from 0.01 to 0.08 sulfonic acid groups per aromatic ring.

The number of $SO_2X$ groups per aromatic ring is determined by averaging over all the aromatic rings of the sulfonated poly(arylene ether sulfone) polymer (sP). To this end, the number of $SO_2X$ groups in the sulfonated poly (arylene ether sulfone) polymer (sP) is divided by the number of aromatic rings in the sulfonated poly(arylene ether sulfone) polymer (sP). Methods of determining the number of $SO_2X$ groups and the number of aromatic rings, each in the sulfonated poly(arylene ether sulfone) polymer (sP), are known to a person skilled in the art. The number of $SO_2X$ groups is determinable, for example, by acid-base titration or by spectroscopic methods such as $H^1$NMR spectroscopy or IR spectroscopy (infrared spectroscopy). Sulfonated aromatic polymers having $SO_2X$ groups on the aromatic ring display characteristic peaks and bands, making it possible to determine the number of $SO_2X$ groups per aromatic ring in the sulfonated poly(arylene ether sulfone) polymer (sP). The ratio of sulfonated to non-sulfonated aromatic rings can also be determined by these methods, in particular by $H^1$NMR spectroscopy.

When the non-sulfonated poly(arylene ether sulfone) polymer has aromatic rings which differ in their degrees of substitution it is thus typically the case that the strongest nucleophilic aromatic rings are preferentially sulfonated.

Component (B)

The membrane (M) comprises as component (B) a non-sulfonated poly(arylene sulfone) polymer (P). In the present case the terms "a non-sulfonated poly(arylene sulfone) polymer (P)" and "component (B)" are used synonymously and therefore have the same meaning.

The term "a non-sulfonated poly(arylene sulfone) polymer (P)" in the present case, is understood to mean exactly one non-sulfonated poly(arylene sulfone) polymer (P) and also mixtures of two or more non-sulfonated poly(arylene sulfone) polymers (P).

"Non-sulfonated" within the context of the present invention means that the non-sulfonated poly(arylene sulfone) polymer (P) does not comprise any $—SO_2X$ group, wherein X is selected from the group consisting of Cl and $O^-$ combined with one cation equivalent.

"One cation equivalent" within the context of the present invention means one cation of a single positive charge or one charge equivalent of a cation with two or more positive charges, for example, $H^+$, $Li^+$, $Na^+$, $K^+$, $Mg^{2+}$, $Ca^{2+}$ or $NH_4^+$.

Preferably, the non-sulfonated poly(arylene sulfone) polymer (P) comprises units of formula (II)

(II)

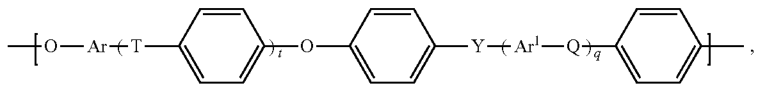

where t and q: are each independently 0, 1, 2 or 3,

Q, T and Y: are each independently a chemical bond or a group selected from $—O—$, $—S—$, $—SO_2—$, $—(S{=}O)—$, $—(C{=}O)—$, $—N{=}N—$ and $—CR^aR^b—$ wherein $R^a$ and $R^b$ are each independently a hydrogen atom or a $C_1$-$C_{12}$-alkyl, $C_1$-$C_{12}$-alkoxy or $C_6$-$C_{18}$-aryl group, and where at least one of Q, T and Y is $—SO_2—$ and Ar, $Ar^1$: are each independently an arylene group having from 6 to 18 carbon atoms.

A further object of the present invention is therefore a membrane (M), wherein the non-sulfonated poly(arylene sulfone) polymer (P) comprises units of formula (II)

(II)

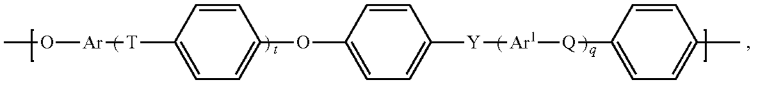

where t and q: are each independently 0, 1, 2 or 3,

Q, T and Y: are each independently a chemical bond or a group selected from —O—, —S—, —$SO_2$—, —(S═O)—, —(C═O)—, —N═N— and —$CR^aR^b$— wherein $R^a$ and $R^b$ are each independently a hydrogen atom or a $C_1$-$C_{12}$-alkyl, $C_1$-$C_{12}$-alkoxy or $C_6$-$C_{18}$-aryl group, and where at least one of Q, T and Y is —$SO_2$— and Ar, $Ar^1$: are each independently an arylene group having from 6 to 18 carbon atoms.

If Q, T or Y, among the abovementioned conditions, is a chemical bond, this is understood to mean that the adjacent group to the left and the adjacent group to the right are bonded directly to one another via a chemical bond. Preferably, however, Q, T and Y in formula (II) are each independently selected from —O— and —$SO_2$—, with the proviso that at least one of the group consisting of Q, T and Y is —$SO_2$—.

If Q, T or Y is —$CR^aR^b$—, $R^a$ and $R^b$ are each independently a hydrogen atom or a $C_1$-$C_{12}$-alkyl, $C_1$-$C_{12}$-alkoxy or $C_6$-$C_{18}$-aryl group.

Preferred $C_1$-$C_{12}$-alkyl groups comprise linear and branched, saturated alkyl groups having from 1 to 12 carbon atoms. Particular mention should be made of the following radicals: $C_1$-$C_6$-alkyl radical such as methyl, ethyl, n-propyl, i-propyl, n-butyl, sec-butyl, 2- or 3-methylpentyl and longer-chain radicals such as unbranched heptyl, octyl, nonyl, decyl, undecyl, lauryl and the singly or multiply branched analogs thereof.

Useful alkyl radicals in the aforementioned usable $C_1$-$C_{12}$-alkoxy groups include the alkyl groups having from 1 to 12 carbon atoms defined above. Cycloalkyl radicals usable with preference comprise especially $C_3$-$C_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are each independently a $C_6$-$C_{18}$-arylene group. Proceeding from the starting materials described below, Ar is preferably derived from an electron-rich aromatic substance subject to easy electrophilic attack, preferably selected from the group consisting of hydroquinone, resorcinol, dihydroxynaphthalene, especially 2,7-dihydroxynaphthalene, and 4,4'-bisphenol. Preferably, $Ar^1$ is an unsubstituted $C_6$- or $C_{12}$-arylene group.

Useful $C_6$-$C_1$-arylene groups Ar and $Ar^1$ especially include phenylene groups such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and $Ar^1$ in the preferred embodiment of formula (II) are each independently selected from the group consisting of 1,4-phenylene, 1,3-phenylene, naphthylene, especially 2,7-dihydroxynaphthylene, and 4,4'-bisphenylene.

Preferred non-sulfonated poly(arylene sulfone) polymers (P) are those comprising at least one of the units Ia to Io as defined above as repeat structural units.

In addition to the preferred units Ia to Io, preference is also given to those units in which one or more 1,4-phenylene units which originate from hydroquinone are replaced by 1,3-phenylene units which originate from resorcinol or by naphthylene units which originate from dihydroxynaphthalene.

Particularly preferred units of the general formula (II) are the units Ia, Ig and Ik. It is also particularly preferred when the non-sulfonated poly(arylene sulfone) polymers (P) of component (B) are formed essentially from one kind of units of the general formula (II), especially from a unit selected from Ia, Ig and Ik.

In a particularly preferred embodiment, Ar=1,4-phenylene, t=1, q=0, T is a chemical bond and Y═$SO_2$. Particularly preferred non-sulfonated poly(arylene sulfone) polymers (B) formed from the aforementioned repeat unit are referred to as poly(phenylene sulfone) (PPSU) (formula Ig).

In a further particularly preferred embodiment, Ar=1,4-phenylene, t=1, q=0, T=$C(CH_3)_2$ and Y═$SO_2$. Particularly preferred non-sulfonated poly(arylene sulfone) polymers (B) formed from the aforementioned repeat unit are referred to as polysulfone (PSU) (formula Ia).

In a further particularly preferred embodiment, Ar=1,4-phenylene, t=1, q=0, T=Y═$SO_2$. Particularly preferred non-sulfonated poly(arylene sulfone) polymers (B) formed from the aforementioned repeat unit are referred to as poly(ether sulfone) (PESU) (formula Ik).

In the most preferred embodiment, Ar=1,4-phenylene, t=1, q=0 and T=Y═$SO_2$.

Therefore, another object of the present invention is a membrane (M), wherein the non-sulfonated poly(arylene sulfone) polymer (P) is a poly(ether sulfone) and comprises units of formula (lk)

(lk)

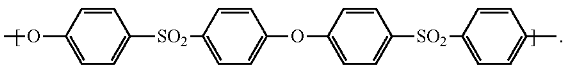

The non-sulfonated poly(arylene ether sulfone) polymers preferably have weight-average molecular weights $M_w$ of 10 000 to 150 000 g/mol, especially of 15 000 to 120 000 g/mol, more preferably of 18 000 to 100 000 g/mol, determined by means of gel permeation chromatography in a dimethylacetamide solvent against narrow-distribution polymethylmethacrylate as standard.

Preparation processes which lead to the aforementioned non-sulfonated poly(arylene sulfone) polymers are known per se to those skilled in the art and are described, for example, in Herman F. Mark, "Encyclopedia of Polymer Science and Technology", third edition, Volume 4, 2003, "Polysulfones" chapter on pages 2 to 8, and in Hans R. Kricheldorf, "Aromatic Polyethers" in: Handbook of Polymer Synthesis, second edition, 2005, on pages 427 to 443.

Particular preference is given to the reaction of at least one aromatic compound having two halogen substituents and at least one aromatic compound having two functional groups reactive toward the aforementioned halogen substituents in aprotic polar solvents in the presence of anhydrous alkali metal carbonate, especially sodium, potassium or calcium carbonate or mixtures thereof, very particular preference being given to potassium carbonate. A particularly suitable combination is N-methyl-2-pyrrolidone as solvent and potassium carbonate as base.

Method for the Preparation of the Membrane (M)

A membrane (M) according to the present invention can be prepared from the sulfonated poly(arylene ether sulfone) polymer (sP) (component (A)) and the non-sulfonated poly (arylene sulfone) polymer (P) (component (B)) by any method known to the skilled person.

In the context of the present invention, the term "membrane" means a semipermeable structure capable of separating two fluids or separating molecular and/or ionic components or particles from a liquid. Thus, a membrane acts as a selective barrier, allowing some particles, substances or chemicals to pass through, while retaining others. The membrane may have various geometries such as flat sheet, spiral wound, pillows, tubular, single bore hollow fiber or multiple bore hollow fiber.

Preferably, the membrane (M) is prepared by a method comprising the steps:

a) providing a solution (S) which comprises the sulfonated poly(arylene ether sulfone) polymer (sP) according to component (A), the non-sulfonated poly (arylene sulfone) polymer (P) according to component (B), at least one pore forming additive (C) and at least one solvent (D), and
b) separating the at least one pore forming additive (C) and the at least one solvent (D) from the solution (S) to obtain the membrane (M).

Therefore, a further object of the present invention is a method for the preparation of the membrane (M), wherein the method comprises the steps:

a) providing a solution (S) which comprises the sulfonated poly(arylene ether sulfone) polymer (sP) according to component (A), the non-sulfonated poly (arylene sulfone) polymer (P) according to component (B), at least one pore forming additive (C) and at least one solvent (D), and
b) separating the at least one pore forming additive (C) and the at least one solvent (D) from the solution (S) to obtain the membrane (M).

Step a)

In step a), a solution (S) which comprises the sulfonated poly(arylene ether sulfone) polymer (sP) according to component (A), the non-sulfonated poly(arylene sulfone) polymer (P) according to component (B), at least one pore forming additive (C) and at least one solvent (D) is provided.

"At least one pore forming additive" within the context of the present invention means precisely one pore forming additive, and also a mixture of two or more pore forming additives. "At least one solvent" within the context of the present invention means precisely one solvent, and also a mixture of two or more solvents.

The solution (S) in step a) can be provided by any method known to the skilled person. For example, the solution (S) can be provided in step a) in customary vessels that may comprise a stirring device and preferably a temperature control device. Preferably, the solution (S) is provided by dissolving the sulfonated poly(arylene ether sulfone) polymer (sP), the non-sulfonated poly(arylene sulfone) polymer (P) and the at least one pore forming additive (C) in the at least one solvent (D).

The dissolution of the sulfonated poly(arylene ether sulfone) polymer (sP), the non-sulfonated poly(arylene sulfone) polymer (P) and the at least one pore forming additive (C) in the at least one solvent (D) to provide the solution (S) is preferably effected under agitation.

Step a) is preferably carried out at elevated temperatures, especially in the range from 20 to 100° C., more preferably in the range from 40 to 80° C. A person skilled in the art will choose the temperature in accordance with the at least one solvent (D).

The solution (S) preferably comprises the sulfonated poly(arylene ether sulfone) polymer (sP), the non-sulfonated poly(arylene sulfone) polymer (P) and the at least one pore forming additive (C) completely dissolved in the at least one solvent (D). This means that the solution (S) preferably comprises no solid particles of the sulfonated poly(arylene ether sulfone) polymer (sP), the non-sulfonated poly(arylene sulfone) polymer (P) and the at least one pore forming additive (C). Therefore, the sulfonated poly(arylene ether sulfone) polymer (sP), the non-sulfonated poly(arylene sulfone) polymer (P) and the at least one pore forming additive (C) preferably cannot be separated from the at least one solvent (D) by filtration.

The solution (S) preferably comprises from 1 to 20% by weight of the sulfonated poly(arylene ether sulfone) polymer (sP), from 5 to 20% by weight of the non-sulfonated poly(arylene sulfone) polymer (P), from 10 to 20% by weight of the pore forming additive (C) and from 40 to 84% by weight of the at least one solvent (D), each based on the total weight of the solution (S).

Another object of the present invention is therefore also a method for the preparation of a membrane (M), wherein the solution (S) in step a) comprises from 1 to 20% by weight of the sulfonated poly(arylene ether sulfone) polymer (sP), from 5 to 20% by weight of the non-sulfonated poly(arylene sulfone) polymer (P), from 10 to 20% by weight of the pore forming additive (C) and from 40 to 84% by weight of the at least one solvent (D), each based on the total weight of the solution (S).

As the at least one solvent (D), any solvent known to the skilled person for the sulfonated poly(arylene ether sulfone) polymer (sP), the non-sulfonated poly(arylene sulfone) polymer (P) and the at least one pore forming additive (C) is suitable. Preferably, the at least one solvent (D) is soluble in water. Therefore, the at least one solvent (D) is preferably selected from the group consisting of N-alkyl-2-pyrrolidone, preferably N-methyl-2-pyrrolidone, N-ethyl-2-pyrrolidone, N-butyl-2-pyrrolidone and N-tert.-butyl-2-pyrrolidone, 2-pyrrolidone, N-dimethylacetamide, dimethylsulfoxide, dimethylformamide, N,N-dimethyl-2-hydroxypropan amide, N,N-diethyl-2-hydroxypropan amide, γ-valerolactone, dihydrolevoglucosenone, methyl 5-(dimethylamino)-2-methyl-5-oxopentanoate and sulfolane. N-alkyl-2-pyrrolidone, γ-valerolactone and N,N-dimethyl-2-hydroxypropan amide are particularly preferred. N-methylpyrrolidone is most preferred as the at least one solvent (D).

Another object of the present invention is therefore also a method for the preparation of a membrane (M), wherein the at least one solvent (D) is selected from the group consisting of N-alkyl-2-pyrrolidone, preferably N-methyl-2-pyrrolidone, N-ethyl-2-pyrrolidone, N-butyl-2-pyrrolidone and N-tert.-butyl-2-pyrrolidone, 2-pyrrolidone, N,N-dimethylacetamide, dimethylsulfoxide, dimethylformamide, N,N-dimethyl-2-hydroxypropan amide, N,N-diethyl-2-hydroxy-propan amide, γ-valerolactone, dihydrolevoglucosenone, methyl 5-(dimethylamino)-2-methyl-5-oxopentanoate and sulfolane.

The solution (S) preferably comprises in the range from 40 to 84% by weight of the at least one solvent (D), more preferably in the range from 50 to 70% by weight of the at least one solvent (D), based on the total weight of the solution (S).

The solution (S) provided in step a) furthermore comprises at least one pore forming additive (C) for the membrane preparation.

Suitable pore forming additives (C) are poly(alkylene oxides) and alcohols.

Examples for suitable poly(alkylene oxides) are poly (ethylene oxide), poly(propylene oxide) and poly(ethylene oxide)-poly(propylene oxide) copolymer. Examples for suitable alcohols are divalent alcohols or trivalent alcohols like glycerol.

As pore forming additive (C), poly(ethylene oxide) is preferred.

Another object of the present invention is therefore also a method for the preparation of a membrane (M), wherein the at least one pore forming additive (C) is selected from the group consisting of poly(alkylene oxides) and alcohols.

The solution (S) can comprise the at least one pore forming additive (C), for example, in an amount of from 5 to 25% by weight, preferably in the range from 10 to 20% by weight, based on the total weight of the solution (S).

To the person skilled in the art it is clear that the percentages by weight of the sulfonated poly(arylene ether sulfone) polymer (sP), the non-sulfonated poly(arylene sulfone) polymer (P), the at least one pore forming additive (C) and the at least one solvent (D) comprised in the solution (S) typically add up to 100% by weight.

The duration of step a) may vary between wide limits. The duration of step a) is preferably in the range from 10 min to 48 h (hours), especially in the range from 10 min to 24 h, and more preferably in the range from 15 min to 12 h. A person skilled in the art will choose the duration of step a) so as to obtain a homogeneous solution of the sulfonated poly (arylene ether sulfone) polymer (sP), the non-sulfonated poly(arylene sulfone) polymer (P) and the at least one pore forming additive (C) in the at least one solvent (D).

Step b)

In step b), the at least one pore forming additive (C) and the at least one solvent (D) are separated from the solution (S) to obtain the membrane (M).

It is possible to filter the solution (S) provided in step a) before the at least one pore forming additive (C) and the at least one solvent (D) are separated from the solution (S) in step b) to obtain a filtered solution (fS). The following embodiments and preferences for separating the at least one pore forming additive (C) and the at least one solvent (D) from the solution (S) apply equally for separating the at least one pore forming additive (C) and the at least one solvent (D) from the filtered solution (fS).

Moreover, it is possible to degas the solution (S) in step a) before the at least one pore forming additive (C) and the at least one solvent (D) are separated from the solution (S) in step b) to obtain a degassed solution (dS). This embodiment is preferred. The following embodiments and preferences for separating the at least one pore forming additive (C) and the at least one solvent (D) from the solution (S) apply equally for separating the at least one pore forming additive (C) and the at least one solvent (D) from the degassed solution (dS).

The degassing of the solution (S) in step a) can be carried out by any method known to the skilled person, for example, via vacuum or by allowing the solution (S) to rest.

The separation of the at least one pore forming additive (C) and the at least one solvent (D) from the solution (S) can be performed by any method known to the skilled person which is suitable to separate pore forming additives and solvents from polymers.

Preferably, the separation of the at least one pore forming additive (C) and the at least one solvent (D) from the solution (S) is carried out via a phase inversion process.

Another object of the present invention is therefore also a method for the preparation of a membrane (M), wherein the separation of the at least one pore forming additive (C) and the at least one solvent (D) in step b) is carried out via a phase inversion process.

If the separation of the at least one pore forming additive (C) and the at least one solvent (D) is carried out via a phase inversion process, the obtained membrane (M) is typically a porous membrane.

Therefore, another object of the present invention is a membrane (M), wherein the membrane (M) is a porous membrane (M).

As a person skilled in the art knows, the porous membrane (M) typically has a top layer and a supporting structure at the bottom, wherein the top layer is the active filtration layer. The top layer, as well as, the supporting structure typically comprise pores, wherein the pore size distribution of the top layer is actually the only decisive factor for the properties of the membrane. In general, the pore size of the top layer is smaller than the pore size of the supporting structure at the bottom.

Preferably, the pore size of the membrane (M) increases from the top layer, which is used for separation, to the bottom of the membrane (M). Therefore, such a membrane (M) is also called an asymmetric membrane (M).

A further object of the present invention is therefore a membrane (M), wherein the membrane (M) is asymmetric.

The minimal pore diameter of the membrane (M) is preferably <5 nm.

A further object of the present invention is therefore a membrane (M), wherein the membrane (M) has a minimal pore diameter of <5 nm.

According to the present invention, the pores of the top layer usually have an average diameter of 1 nm to 5 nm, determined by gas adsorption-desorption experiments with nitrogen and Harkins-Jura analysis and rejection of diluted poly(ethylene oxide) solutions with a molecular weight of 8 000 g/mol or diluted rose Bengal with a molecular weight of 1 017 g/mol.

The supporting structure can have diameters up to 10 μm.

A phase inversion process within the context of the present invention means a process wherein the dissolved sulfonated poly(arylene ether sulfone) polymer (sP) and the dissolved non-sulfonated poly(arylene sulfone) polymer (P) are transformed into a solid phase. Therefore, a phase inversion process can also be denoted as precipitation process. According to step b), the transformation is performed by separation of the at least one pore forming additive (C) and the at least one solvent (D) from the sulfonated poly (arylene ether sulfone) polymer (sP) and the non-sulfonated poly(arylene sulfone) polymer (P). The person skilled in the art knows suitable phase inversion processes.

The phase inversion process can, for example, be performed by cooling down the solution (S). During this cooling down, the sulfonated poly(arylene ether sulfone) polymer (sP) and the non-sulfonated poly(arylene sulfone)

polymer (P) comprised in the solution (S) precipitate. Another possibility to perform the phase inversion process is to bring the solution (S) in contact with a vapour that is a non-solvent for the sulfonated poly(arylene ether sulfone) polymer (sP) and the non-sulfonated poly(arylene sulfone) polymer (P). The sulfonated poly(arylene ether sulfone) polymer (sP) and the non-sulfonated poly(arylene sulfone) polymer (P) will then as well precipitate. Suitable vapours, that are non-solvents for the sulfonated poly(arylene ether sulfone) polymer (sP) and the non-sulfonated poly(arylene sulfone) polymer (P), are, for example, protic polar solvents described hereinafter in their gaseous state. Another phase inversion process, which is preferred within the context of the present invention, is the phase inversion by immersing the solution (S) into at least one protic polar solvent.

Therefore, in one embodiment of the present invention, in step b), the at least one pore forming additive (C) and the at least one solvent (D) comprised in the solution (S) are separated from the sulfonated poly(arylene ether sulfone) polymer (sP) and the non-sulfonated poly(arylene sulfone) polymer (P) comprised in the solution (S) by immersing the solution (S) into at least one protic polar solvent.

This means that the membrane (M) is formed by immersing the solution (S) into at least one protic polar solvent.

Suitable at least one protic polar solvents are known to the skilled person. The at least one protic polar solvent is preferably a non-solvent for the sulfonated poly(arylene ether sulfone) polymer (sP) and the non-sulfonated poly (arylene sulfone) polymer (P).

Preferred at least one protic polar solvents are water, methanol, ethanol, n-propanol, iso-propanol, glycerol, ethyleneglycol and mixtures thereof. Preferably, the at least one protic polar solvent is water.

Therefore, another object of the present invention is a method for the preparation of a membrane (M), wherein the at least one protic polar solvent is water.

The at least one protic polar solvent is usually comprised in a coagulation bath. The coagulation bath preferably also comprises further components, for example, the same solvent (D) as comprised in the solution (S).

Step b) usually comprises a provision of the solution (S) in a form that corresponds to the form of the membrane (M), which is obtained in step b).

Therefore, in one embodiment of the present invention, step b) comprises a casting of the solution (S) to obtain a film of the solution (S).

Therefore, in one preferred embodiment of the present invention, step b) comprises the following steps:

- b-1) casting the solution (S) provided in step a) to obtain a film of the solution (S),
- b-2) immersing the film of the solution (S) into at least one protic polar solvent, wherein the sulfonated poly (arylene ether sulfone) polymer (sP) and the non-sulfonated poly(arylene sulfone) polymer (P) comprised in the film of the solution (S) are at least partly separated from the at least one pore forming additive (C) and the at least one solvent (D) comprised in the film of the solution (S) to obtain a membrane (M1) which is in the form of a film, and
- b-3) washing the membrane (M1) with water, wherein the sulfonated poly(arylene ether sulfone) polymer (sP) and the non-sulfonated poly(arylene sulfone) polymer (P) comprised in the membrane (M1) are completely separated from the at least one pore forming additive (C) and the at least one solvent (D) comprised in the membrane (M1) to obtain the membrane (M).

Therefore, another object of the present invention is a method for the preparation of a membrane (M), wherein step b) comprises the following steps:

- b-1) casting the solution (S) provided in step a) to obtain a film of the solution (S),
- b-2) immersing the film of the solution (S) into at least one protic polar solvent, wherein the sulfonated poly (arylene ether sulfone) polymer (sP) and the non-sulfonated poly(arylene sulfone) polymer (P) comprised in the film of the solution (S) are at least partly separated from the at least one pore forming additive (C) and the at least one solvent (D) comprised in the film of the solution (S) to obtain a membrane (M1) which is in the form of a film, and
- b-3) washing the membrane (M1) with water, wherein the sulfonated poly(arylene ether sulfone) polymer (sP) and the non-sulfonated poly(arylene sulfone) polymer (P) comprised in the membrane (M1) are completely separated from the at least one pore forming additive (C) and the at least one solvent (D) comprised in the membrane (M1) to obtain the membrane (M).

The term "at least partly" within the context of the present invention means that preferably at least 50% by weight, more preferably at least 60% by weight, of the sulfonated poly(arylene ether sulfone) polymer (sP) and the non-sulfonated poly(arylene sulfone) polymer (P), based on the total weight of the sulfonated poly(arylene ether sulfone) polymer (sP) and the non-sulfonated poly(arylene sulfone) polymer (P) comprised in the film of the solution (S), are separated from the at least one pore forming additive (C) and the at least one solvent (D).

The term "completely" within the context of the present invention means that preferably at least 90% by weight, more preferably at least 95% by weight, of the sulfonated poly(arylene ether sulfone) polymer (sP) and the non-sulfonated poly(arylene sulfone) polymer (P), based on the total weight of the sulfonated poly(arylene ether sulfone) polymer (sP) and the non-sulfonated poly(arylene sulfone) polymer (P) comprised in the membrane (M1), are separated from the at least one pore forming additive (C) and the at least one solvent (D).

In step b-1) the solution (S) can be cast by any method known to the skilled person. Usually, the solution (S) is cast with a casting knife that is heated to a temperature in the range from 20 to 100° C., preferably in the range from 40 to 80° C.

Therefore, another object of the present invention is a method for the preparation of a membrane (M), wherein step b-1) is carried out at a temperature in the range of 40 to 80° C.

The solution (S) is usually cast on a substrate that does not react with the sulfonated poly(arylene ether sulfone) polymer (sP), the non-sulfonated poly(arylene sulfone) polymer (P), the at least one pore forming additive (C) or the at least one solvent (D) comprised in the solution (S).

Suitable substrates are known to the skilled person and are, for example, selected from glass plates and polymer fabrics such as non-woven materials.

To obtain a dense membrane, the separation in step b) is typically carried out by evaporation of the at least one solvent (D) comprised in the solution (S).

In step b-2), the film of the solution (S) is preferably immersed into at least one protic polar solvent at a temperature in the range of 20 to 80° C., more preferably at a temperature in the range of 20 to 60° C.

In step b-3), the membrane (M1) is preferably washed at a temperature in the range of 20 to 80° C., more preferably at a temperature in the range of 20 to 60° C.

The membrane (M) obtained in step b-3) is preferably a flat sheet membrane.

The membrane (M) can be used as nanofiltration membrane.

A further object of the present invention is therefore also the use of the membrane (M) as nanofiltration membrane.

For the production of single bore hollow fibers or multiple bore hollow fibers step b) may be performed by extruding the solution (S) through an extrusion nozzle with the required number of hollow needles. The coagulating liquid is then injected through the hollow needles into the extruded polymer during extrusion, so that parallel continuous channels extending in extrusion direction are formed in the extruded polymer. Preferably, the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent.

Monolithic Film (F)

A further object of the present invention is a monolithic film (F) comprising (A) a sulfonated poly(arylene ether sulfone) polymer (sP) and (B) a non-sulfonated poly(arylene sulfone) polymer (P), wherein the monolithic film (F) has a contact angle of 63 to 77°.

The contact angle is determined by time-resolved automated image analysis by Krüss DSA100 (A. KRÜSS Optronic GmbH, Hamburg, Germany) at 23° C. placing 8 to 10 drops of deionized water with a volume of approximately 2 μL on the sample.

In the context of the present invention, the term "monolithic film" means a film that preferably has no pores. Therefore, the monolithic film is not understood to be a membrane (M). Preferably, the monolithic film is prepared by solution blending.

In a preferred embodiment, the method for the preparation of the monolithic film comprises the steps I) and II):

I) providing a solution (S—F) which comprises the sulfonated poly(arylene ether sulfone) polymer (sP) according to component (A), the non-sulfonated poly (arylene sulfone) polymer (P) according to component (B) and the at least one solvent (D), and II) separating the at least one solvent (D) from the solution (S—F) to obtain the monolithic film (F).

The solution (S—F) preferably comprises from 2 to 17% by weight of component (A), 3 to 18% by weight of component (B) and 65 to 95% by weight of component (D), each based on the total weight of the solution (S—F).

Preferably, the monolithic film (F) comprises from 15 to 80% by weight of component (A) and from 20 to 85% by weight of component (B), each based on the total weight of the monolithic film (F).

The present invention is more particularly elucidated by the following examples without being restricted thereto.

EXAMPLES

Components Used sP (component (A)): sulfonated poly(ether sulfone)

Synthesis of the Sulfonated Poly(Ether Sulfone)

1) Synthesis of the Poly(Ether Sulfone)

In a 4 liter glass reactor fitted with a thermometer, a gas inlet tube and a Dean-Stark-trap, 574.34 g (2.00 mol) of 4,4'-dichlorodiphenylsulfone (DCDPS), 475.53 g (1.90 mol) of 4,4'-dihydroxydiphenylsulfone (DHDPS), 18.621 g (0.10 mol) of 4,4'-biphenol and 297.15 g (2.15 mol) of potassium carbonate with a volume average particle size of 33.2 μm are suspended in 1050 mL NMP (N-methyl-2-pyrrolidone; CAS 872-50-4) in a nitrogen atmosphere. The mixture is heated to 190° C. within one hour. In the following, the reaction time shall be understood to be the time during which the reaction mixture is maintained at 190° C. The water formed in the reaction is continuously removed by distillation. The evaporated solvent is replaced. After a reaction time of 7 hours, the reaction is stopped by the addition of 1950 mL NMP and cooling down to room temperature (within one hour). The potassium chloride formed in the reaction is removed by filtration. The obtained poly(ether sulfone) solution is then precipitated in water, the resulting poly(ether sulfone) beads are separated and then extracted with hot water (85° C.) for 20 h. Then the beads are dried at 120° C. for 24 h at reduced pressure (<100 mbar).

The presence of the 4,4'-biphenol derived units in the copolymer is verified by 1H-NMR spectroscopy. The obtained poly(ether sulfone) has a glass transition temperature ($T_G$) of 230.8° C., a viscosity number of 82.1 mL/g, a molecular weight $M_W$ (GPC in THF, PS standard) of 74 450 g/mol and a polydispersity $M_W/M_N$ of 3.6.

2) Synthesis of the Sulfonated Poly(Ether Sulfone)

From a reservoir sulfuric acid (96%) is provided to a reaction vessel in an amount needed to provide a solution with the targeted sulfonated poly(ether sulfone) concentration of 8% by weight. The temperature of the sulfuric acid is set to the sulfonation temperature. 50 kg of the above-obtained poly(ether sulfone) is dosed to the mixture within 10 to 30 minutes. The reaction mixture is stirred for another 90 minutes to completely dissolve the poly(ether sulfone). The reaction mixture is thereafter stirred for another 90 minutes. In a reservoir equipped with a stirrer and with a wall temperature of 15° C. a liquid L1 is prepared from 3 125 L deionized water and nitric acid so that the nitric acid concentration in the liquid L1 is 0.27% by weight, based on the liquid L1.

As dynamic inline mixing device a one-stage rotor-stator tooth rim dispersion machine with a concave rotor is used (Cavitron® CD1010, with a cone mixing system; Verfahrenstechnik v. Hagen & Funke GmbH, Sprockhövel, Germany). The dynamic inline mixing device functions as a pump which due to operating it at maximum rotational speed of up to 12 000 rpm. It draws the liquid L1 from the reservoir, whereby the inline mixing device operates in recirculation loop operation. While the three-way valve is set to the sulfuric acid reservoir, the gear pump is started to pump the sulfuric acid to the dynamic inline mixer and flushing the piping while doing this. After the connecting pipes are purged by the sulfuric acid, the respective sulfonated poly (ether sulfone) solution is fed to the dynamic inline mixing device by opening the three-way valve towards the reaction vessel containing the sulfonated poly(ether sulfone) solution and pumping it into the dynamic inline mixer. Upon the contacting of the respective sulfonated poly(ether sulfone) solution with the liquid L1 a suspension is obtained. The suspension is recirculated into the reservoir of liquid L1 whereby its solid content increased continually. To avoid settling, the suspension is stirred in the reservoir. The liquid L1 and the suspension respectively are passed through the dynamic inline mixing device in an amount of about 75 L/min. The temperature of the suspension in the reservoir is monitored. In course of the process the temperature of the suspension rises by between 30 to 35° C. The suspension is recirculated until the respective sulfonated poly(ether sulfone) solution is used up. Thereafter the pipes are purged with the sulfuric acid.

The suspension is filtered through a Nutsche, whereby 1 bar pressure is applied. A filter with a nominal pore size of 10 µm is used. The filter cake is washed with about 800 L of deionized water with a temperature of about 40° C. per washing is used. The washing is interrupted as soon as the filtrate water has a pH of 4 or higher. Typically, not more than six washings are carried out. Thereafter, the obtained respective sulfonated poly(ether sulfone) is dried in the Nutsche under vacuum at 55 to 60° C. until a residual water content of below 2% by weight, based on the weight of the sulfonated poly(ether sulfone), is obtained.

The sulfonated poly(ether sulfone) polymer has a viscosity number of 86.3 mL/g, a molecular weight Mw (GPC in THF, PS standard) of 72 400 g/mol, a polydispersity of $M_W/M_N$=3.6 and an Ion Exchange Capacity IEC of 0.210 meq/g.

- P (component (B)): poly(ether sulfone); Ultrason® E 6020 P; BASF SE; Viscosity number: 81 $cm^3/g$ (determined according to ISO 307; in 0.01 g/mL phenol/1, 2-orthodichlorobenzene, 1:1 solution); Glass transition temperature $T_G$: 225° C. (determined according to ISO 11357-1/-2, DSC, 10° C./min); Molecular weight Mw: 75 000 g/mol (determined by GPC in THF, PS standard); Polydispersity $M_W/M_N$: 3.4
- PEO 1 (component (C1)): poly(ethylene oxide); Pluriol® 200 E; BASF SE; Average molecular weight $M_w$: 200 g/mol (calculated from the OH numbers according to DIN 53240)
- PEO 2 (component (C2)): poly(ethylene oxide); Pluriol® 8000 E; BASF SE; Average molecular weight $M_w$: 7 510 g/mol (calculated from GPC in water with 0.01 mol phosphate buffer pH 7.4, TSKgel GMPWXL column, Tosoh Bioscience with poly(ethylene oxide) standard 106-1 522 000 g/mol); Polydispersity $M_W/M_N$: 1.1; solution viscosity characterised by the K-value of 28.8 (determined according to the method of Fikentscher (Fikentscher, Cellulosechemie 13, 1932 (58)))
- PEO 3 (component (C3)): poly(ethylene oxide); Pluriol® 9000 E; BASF SE; Average molecular weight $M_W$: 10 800 g/mol (calculated from GPC in water with 0.01 mol phosphate buffer pH 7.4, TSKgel GMPWXL column, Tosoh Bioscience with poly(ethylene oxide) standard 106-1 522 000 g/mol); Polydispersity $M_W/M_N$: 1.2; solution viscosity characterised by the K-value of 33 (determined according to the method of Fikentscher (Fikentscher, Cellulosechemie 13, 1932 (58)))

General Procedures

Pure Water Permeation (PWP)

The pure water permeation (PWP) of the membranes is tested using a pressure cell with a diameter of 74 mm using ultrapure water (salt-free water, filtered by a Millipore UF-system) at 23° C. and 1 bar water pressure. The pure water permeation (PWP) is calculated as follows (equation 1):

$$PWP = \frac{m}{A \times P \times t} \quad (1)$$

PWP: pure water permeance [kg/bar h $m^2$]
m: mass of permeated water [kg]
A: membrane area [$m^2$]
P: pressure [bar]
t: time of the permeation experiment [h].

In a subsequent test, solutions of rose bengal (Sigma-Aldrich, 1 017 g/mol; 35 µM in ultra-pure water) and poly(ethylene oxide) (Pluriol® 8000 E, 0.1 wt % in ultra-pure water) are used as feed to be filtered by the membrane at a pressure of 0.2 bar and rejection (MWCO %) is calculated by equation (2) in which $C_F$ and $C_P$ represent the concentrations in initial feed and in permeate, respectively. For poly(ethylene oxide)-standard (MWCO 1) the concentrations of the feed and permeate are determined by GPC-measurement (refractive index detector) while for rose bengal (MWCO 2) the concentrations are recorded on a Spectroquant® Nova 60 (Merck KGA, Darmstadt, Germany) UV-vis spectrophotometer at a wavelength of 550 nm.

$$MWCO = \left(1 - \frac{C_P}{C_F}\right) \times 100[\%] \quad (2)$$

MWCO 1: feed PEO 8000
MWCO 2: feed rose bengal

According to Matsuyama et. al (Ind. Eng. Chem. Res. 2017, 56, 11302) PEO 8000 has a calculated stokes radius of 2.5 nm.

Viscosity

The polymer solution viscosity is measured with a Brookfield Viscometer DV-I Prime (Brookfield Engineering Laboratories, Inc. Middleboro, USA) with RV 6 spindle at 60° C. with 20 rpm.

Turbidity

The polymer solution turbidity is measured at 60° C. with a turbidimeter 2100AN (Hach Lange GmbH, Dusseldorf, Germany) employing a filter of 860 nm and expressed in nephelometric turbidity units (NTU).

Contact Angle

The contact angle (CA) of the polymer films is measured at 23° C. by placing 8 to 10 drops of deionized water with a volume of approximately 2 µL on the sample. The contact angle is determined by time-resolved automated image analysis by Krüss DSA100 (A. KRÜSS Optronic GmbH, Hamburg, Germany).

Film Thickness

The film thickness is measured with a Mitutoyo ID-C112XB (Mitutoyo Corporation, Kawasaki, Japan).

PEO Share

The poly(ethylene oxide) content of the membranes (PEO share) is determined by dissolving the membrane sample in deuterated chloroform ($CDCl_3$) and measuring proton nuclear magnetic resonance spectroscopy (1H-NMR) with a Bruker Avance III 400 (Bruker Corporation, Billerica, USA). The signal at 3.7 ppm is analyzed to obtain the overall PEO share.

BET Surface Assessment

Solvent exchanged and dried membrane samples are used for Brunauer-Emmet-Teller (BET) surface assessment. The wet membrane samples are stored for 12 h subsequently in water/ethanol (1:1 wt/wt), water/ethanol (1:2 wt/wt), ethanol/n-hexane (1:1 wt/wt) and finally n-hexane before drying at 60° C. under vacuum.

The BET surface is determined by gas-adsorption-desorption (GAD) experiments with nitrogen by 5-point method with ASAP 2420 (Fa. Micromeritics, Norcross, USA). The samples are activated at 130° C. for 15 min before measurement.

Preparation of Monolithic Films

Comparative Examples C1-F and C4-F

As given in table 1, into a three-neck flask equipped with a magnetic stirrer 20 g sulfonated poly(ether sulfone) polymer (sP) (component (A)) or 20 g non-sulfonated poly(ether sulfone) polymer (P) (component (B)), respectively, and 80 g NMP (component (D)) are added. The mixture is heated under gentle stirring at 60° C. until a homogeneous clear viscous solution is obtained. The solution is degassed overnight at room temperature. After that, the solution is reheated at 60° C. for 2 hours and casted onto a glass plate with a casting knife (300 microns) at 60° C. using an Erichsen Coating machine (Coatmaster 510, Erichsen GmbH & Co KG, Hemer, Germany) operating at a speed of 5 mm/s. The solvent is evaporated at 50° C. at 10 mbar overnight and the dried film transferred on the glass plate into a water bath at 25° C. for 10 minutes. After the film is detached from the glass plate, it is subjected extraction with water at 80° C. (160 liters/hours) overnight.

Inventive Examples I2-F and I3-F

As given in table 1, into a three-neck flask equipped with a magnetic stirrer sulfonated poly(ether sulfone) polymer (sP) (component (A)) and non-sulfonated poly(ether sulfone) polymer (P) (component (B)) in the amounts given in table 1, and 80 g NMP (component (D)) are added. The mixture is heated under gentle stirring at 60° C. until a homogeneous clear viscous solution (S—F) is obtained. The solution (S—F) is degassed overnight at room temperature. After that, the solution (S—F) is reheated at 60° C. for 2 hours and casted onto a glass plate with a casting knife (300 microns) at 60° C. using an Erichsen Coating machine (Coatmaster 510, Erichsen GmbH & Co KG, Hemer, Germany) operating at a speed of 5 mm/s. The solvent is evaporated at 50° C. at 10 mbar overnight and the dried film transferred on the glass plate into a water bath at 25° C. for 10 minutes. After the film is detached from the glass plate, it is subjected extraction with water at 80° C. (160 liters/hours) overnight.

The viscosity, thickness and contact angle of the resulting films are determined (table 1).

TABLE 1

| Example | (A) [g] | (B) [g] | (D) [g] | Viscosity [Pas] | Thickness [µm] | Contact angle [°] |
|---|---|---|---|---|---|---|
| C1-F | — | 20 | 80 | 0.77 | 29 | 78.4 |
| I2-F | 4 | 16 | 80 | 0.87 | 38 | 76.3 |
| I3-F | 15 | 5 | 80 | 0.89 | 36 | 65.1 |
| C4-F | 20 | — | 80 | 0.86 | 28 | 61.7 |

By solution blending sulfonated poly(ether sulfone) (component (A)) with non-sulfonated poly(ether sulfone) (component (B)) monolithic films having contact angles between 63 and 77° and defined hydrophilicity can be obtained.

Preparation of Membranes

Comparative Examples C1-M and C2-M

As given in table 2, into a three-neck flask equipped with a magnetic stirrer 25 g non-sulfonated poly(ether sulfone) (component (B)), 15 g poly(alkylene oxide) (Pluriol® 200 or 9000 E; component (C)) and 60 g of NMP (component (D)) are added. The mixture is heated under gentle stirring at 60° C. until a homogeneous clear viscous solution (S) is obtained. The solution (S) is degassed overnight at room temperature. After that, the solution (S) is reheated at 60° C. for 2 hours and casted onto a glass plate with a casting knife (300 microns) at 60° C. using an Erichsen Coating machine (Coatmaster 510, Erichsen GmbH & Co KG, Hemer, Germany) operating at a speed of 5 mm/s to obtain a film of the solution (S). The film of the solution (S) is allowed to rest for 30 seconds before immersion in a water-based coagulation bath (60% by weight water/40% by weight NMP) at 25° C. for 10 minutes to obtain a membrane (M1). After the membrane (M1) is detached from the glass plate, the membrane (M1) is carefully transferred into a water bath for 12 h. Subsequently the membrane (M1) is washed with water at 60° C. three times to obtain the membrane (M).

Comparative Examples C3-M and C4-M

As given in table 2, into a three-neck flask equipped with a magnetic stirrer 25 g sulfonated poly(ether sulfone) polymer (component (A)), 15 g poly(alkylene oxide) (Pluriol® 200 or 9000 E; component (C)) and 60 g of NMP (component (D)) are added. The mixture is heated under gentle stirring at 60° C. until a homogeneous clear viscous solution (S) is obtained. The solution (S) is degassed overnight at room temperature. After that, the solution (S) is reheated at 60° C. for 2 hours and casted onto a glass plate with a casting knife (300 microns) at 60° C. using an Erichsen Coating machine (Coatmaster 510, Erichsen GmbH & Co KG, Hemer, Germany) operating at a speed of 5 mm/s to obtain a film of the solution (S). The film of the solution (S) is allowed to rest for 30 seconds before immersion in a water-based coagulation bath (60% by weight water/40% by weight NMP) at 25° C. for 10 minutes to obtain a membrane (M1). After the membrane (M1) is detached from the glass plate, the membrane (M1) is carefully transferred into a water bath for 12 h. Subsequently the membrane (M1) is washed with water at 60° C. three times to obtain the membrane (M).

Inventive Examples I7-M to I12-M

Into a three-neck flask equipped with a magnetic stirrer sulfonated poly(ether sulfone) polymer (component (A)) and non-sulfonated poly(ether sulfone) (component (B)) in the amounts given in table 2, 15 g poly(alkylene oxide) (Pluriol® 200 or 9000 E; component (C)) and 60 g of NMP (component (D)) are added. The mixture is heated under gentle stirring at 60° C. until a homogeneous clear viscous solution (S) is obtained (step a)). The solution (S) is degassed overnight at room temperature. After that, the solution (S) is reheated at 60° C. for 2 hours and casted onto a glass plate with a casting knife (300 microns) at 60° C. using an Erichsen Coating machine (Coatmaster 510, Erichsen GmbH & Co KG, Hemer, Germany) operating at a speed of 5 mm/s to obtain a film of the solution (S) (step b-1)). The film of the solution (S) is allowed to rest for 30 seconds before immersion in a water-based coagulation bath (60% by weight water/40% by weight NMP) at 25° C. for 10 minutes to obtain a membrane (M1). After the membrane (M1) is detached from the glass plate, the membrane (M1) is carefully transferred into a water bath for 12 h. Subsequently the membrane (M1) is washed with water at 60° C. three times to obtain the membrane (M).

The compositions and properties of the solutions (S), as well as of the prepared membranes (M), are shown in table 2.

TABLE 2

| Example | (A) [g] | (B) [g] | (C1) [g] | (C3) [g] | (D) [g] | Viscosity [Pas] | Turbidity [NTU] | PWP [kg/hm$^2$bar] | MWCO 1 [%] | MWCO 2 [%] | PEO share [% by weight] | BET [m$^2$/g] |
|---|---|---|---|---|---|---|---|---|---|---|---|---|
| C1-M | — | 25 | 15 | — | 60 | 6.5 | 0.63 | 0 | — | — | 0.4 | 11.1 |
| C2-M | — | 25 | — | 15 | 60 | 13.1 | 1.01 | 10 | — | — | 11.5 | 26.3 |
| I7-M | 5 | 20 | 15 | — | 60 | 6.4 | 0.88 | 60 | 80.6 | 92.1 | 0 | 40.6 |
| I8-M | 7.5 | 17.5 | 15 | — | 60 | 6.5 | 0.97 | 190 | 88.7 | 87.3 | 0.1 | 48.6 |
| I9-M | 7.5 | 17.5 | — | 15 | 60 | 12.6 | 1.36 | 180 | 99.7 | 86.6 | 5.1 | 69.3 |
| I10-M | 10 | 15 | 15 | — | 60 | 6.7 | 1.53 | 155 | 100 | 97.2 | 0 | 62.6 |
| I11-M | 12.5 | 12.5 | 15 | — | 60 | 7.0 | 1.27 | 160 | 100 | 89.7 | 0.1 | 79.8 |
| I12-M | 18.75 | 6.25 | 15 | — | 60 | 6.8 | 1.55 | 54 | 100 | 99.4 | 0 | 141.6 |
| C3-M | 25 | — | 15 | — | 60 | 6.8 | 1.96 | 23 | 99.8 | 99.1 | 0.1 | 172.1 |
| C4-M | 25 | — | — | 15 | 60 | 14.8 | 2.51 | 30 | 100 | 99.5 | 1.5 | 209.6 |

As can be seen from table 2, the inventive membranes show all a high pure water permeation of >50 kg/h m$^2$ bar and a high rejection MWCO 1 and MWCO 2 of at least 80%. Further, the solutions show low NTU values <1.6.

Figure 1:
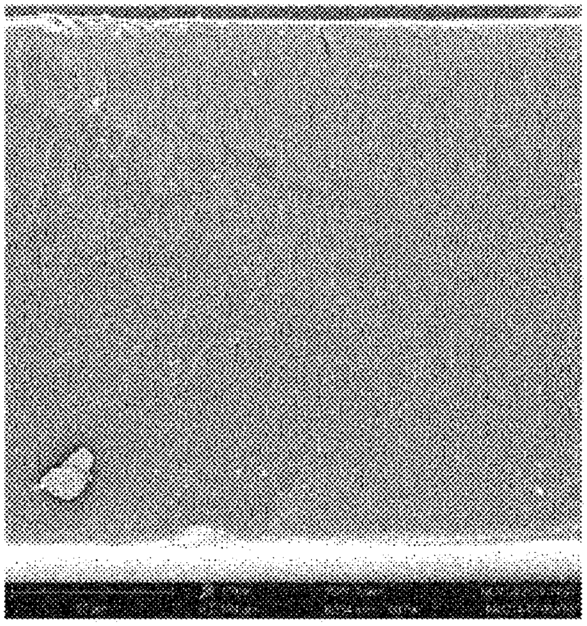
FIG. 1 shows a cross-section of the membrane of inventive example 19-M
Figure 2:
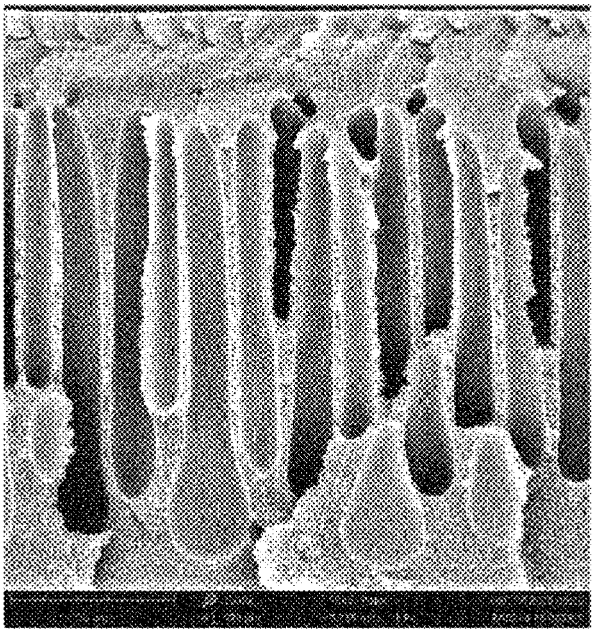
FIG. 2 shows a cross-section of the membrane of comparative example C2-M (1500× magnification)

As can be seen from the figures, the membrane according to the invention shows a well-established nano porous filtration layer with no defects or macrovoids. The membrane according to comparative example C2-M shows numerous macrovoids and defects which could partially penetrate the filtration layer on the top.

Comparative Examples C5-M and C6-M

As shown in table 3, into a three-neck flask equipped with a magnetic stirrer non-sulfonated poly(ether sulfone) (component (B)) in the amounts given, poly(alkylene oxide) (Pluriol® 200; component (C)) in the amounts given and NMP (component (D)) in the amounts given are added. The mixture is heated under gentle stirring at 60° C. until a homogeneous clear viscous solution (S) is obtained. The solution (S) is degassed overnight at room temperature. After that, the solution (S) is reheated at 60° C. for 2 hours and casted onto a glass plate with a casting knife (300 microns) at 60° C. using an Erichsen Coating machine (Coatmaster 510, Erichsen GmbH & Co KG, Hemer, Germany) operating at a speed of 5 mm/s to obtain a film of the solution (S). The film of the solution (S) is allowed to rest for 30 seconds before immersion in a water-based coagulation bath (60% by weight water/40% by weight NMP) at 25° C. for 10 minutes to obtain a membrane (M1). After the membrane (M1) is detached from the glass plate, the membrane (M1) is carefully transferred into a water bath for 12 h. Subsequently the membrane (M1) is washed with water at 60° C. three times to obtain the membrane (M).

Inventive Examples I13-M to I17

As shown in table 3, into a three-neck flask equipped with a magnetic stirrer sulfonated poly(ether sulfone) polymer (component (A)), non-sulfonated poly(ether sulfone) (component (B)), poly(alkylene oxide) (Pluriol® 200; component (C)) and a solvent (component (D)) in the amounts given are added. The mixture is heated under gentle stirring at 60° C. until a homogeneous clear viscous solution (S) is obtained. The solution (S) is degassed overnight at room temperature. After that, the solution (S) is reheated at 60° C. for 2 hours and casted onto a glass plate with a casting knife (300 microns) at 60° C. using an Erichsen Coating machine (Coatmaster 510, Erichsen GmbH & Co KG, Hemer, Germany) operating at a speed of 5 mm/s to obtain a film of the solution (S). The film of the solution (S) is allowed to rest for 30 seconds before immersion in a water-based coagulation bath at 25° C. for 10 minutes to obtain a membrane (M1). After the membrane (M1) is detached from the glass plate, the membrane (M1) is carefully transferred into a water bath for 12 h. Subsequently the membrane (M1) is washed with water at 60° C. three times to obtain the membrane (M).

The properties of the solutions are shown in table 3, the properties of the membranes are shown in table 4.

TABLE 3

| Example | (A) [g] | (B) [g] | (C1) [g] | (D) [g] | Solvent (D) | Viscosity [Pas] | Turbidity [NTU] | Coagulation bath |
|---|---|---|---|---|---|---|---|---|
| C5-M | — | 20 | 12 | 68 | NMP | 1.2 | 0.60 | 60% by weight water/ 40% by weight NMP |
| C6-M | — | 30 | 18 | 52 | NMP | 28.3 | 0.75 | 60% by weight water/ 40% by weight NMP |
| I13-M | 8 | 12 | 12 | 68 | NMP | 1.4 | 0.98 | 60% by weight water/ 40% by weight NMP |
| I14-M | 12 | 18 | 18 | 52 | NMP | 31.9 | 1.39 | 60% by weight water/ 40% by weight NMP |

TABLE 3-continued

| Example | (A) [g] | (B) [g] | (C1) [g] | (D) [g] | Solvent (D) | Viscosity [Pas] | Turbidity [NTU] | Coagulation bath |
|---|---|---|---|---|---|---|---|---|
| I15-M | 10 | 15 | 15 | 60 | AMD (N,N-dimethyl-2-hydroxy-propanamide; CAS 35123-06-9) | 23.7 | 2.01 | 60% by weight water/ 40% by weight AMD |
| I16-M | 10 | 15 | 15 | 60 | TBP (N-tert.-butyl-2-pyrrolidone; CAS 20687-53-0) | 25.6 | 1.90 | 60% by weight water/ 40% by weight TBP |
| I17-M | 10 | 15 | 15 | 60 | GVL (γ-valerolactone; CAS 108-29-2) | 9.6 | 2.3 | water |

TABLE 4

| Example | PWP [kg/ $hm^2$bar] | MWCO 1 [%] | MWCO 2 [%] | PEO share [% by weight] | BET [$m^2$/g] |
|---|---|---|---|---|---|
| C5-M | 0 | — | — | 0.2 | 12.9 |
| C6-M | 0 | — | — | 0.4 | 8.6 |
| I13-M | 140 | 95.0 | 92.45 | 0 | 42.0 |
| I14-M | 62 | 100 | 97.8 | 0 | 67.8 |
| I15-M | 120 | 100 | 98.84 | 0 | 71.5 |
| I16-M | 80 | 99.9 | 98.96 | 0 | 60.5 |
| I17-M | 50 | 99.7 | 97.05 | 0.1 | 47.4 |

As can be seen from tables 3 and 4, the inventive membranes show all a high pure water permeation of 50 to 140 kg/h $m^2$ bar and a high rejection MWCO 1 and MWCO 2 of at least 85% for PE08000 and rose Bengal. The BET surfaces of the inventive membranes account for more than 30 $m^2$/g. The PEO shares in the membrane matrix of less than 0.2% by weight indicate that the membrane hydrophilicity originates from the hydrophilicity of the sP/P matrix having contact angles of 63 to 77°. The membrane preparation can be carried out with different concentrations of sP/P (20-30 wt %) and PEO as pore former (12-18 wt %) and also with different solvents (NMP, AMD, TBP and GVL).

The invention claimed is:

1. A membrane comprising a blend of (A) a sulfonated poly(arylene ether sulfone) polymer and (B) a non-sulfonated poly(arylene sulfone) polymer, wherein the membrane has a minimal pore diameter of <5 nm and a pure water permeation of >50 kg/(h $m^2$ bar) and wherein the membrane is a nanofiltration membrane, wherein the average pore diameter is determined by gas adsorption-desorption experiments with nitrogen and Harkins-Jura analysis and rejection of diluted poly(ethylene oxide) solutions with a molecular weight of 8 000 g/mol or diluted rose Bengal with a molecular weight of 1 017 g/mol, and the pure water permeation is determined using a pressure cell with a diameter of 74 mm using ultrapure water (salt-free water, filtered by a Millipore UF-system) at 23° C. and 1 bar water pressure, wherein the membrane comprises from 15 to 80% by weight of the sulfonated poly(arylene ether sulfone) polymer, based on the total weight of the membrane, and wherein the sulfonated poly(arylene ether sulfone) polymer comprises units of formula (III)

(III)

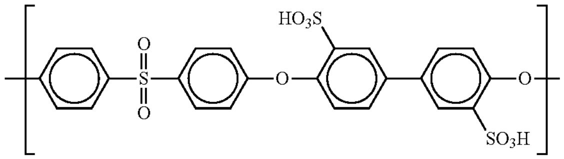

and/or formula (IV)

(IV)

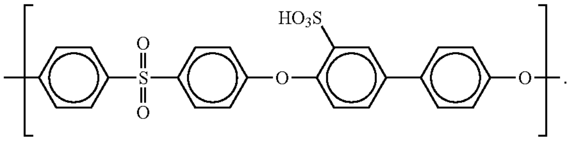

2. The membrane according to claim 1, wherein the non-sulfonated poly(arylene sulfone) polymer comprises units of formula (II)

(II)

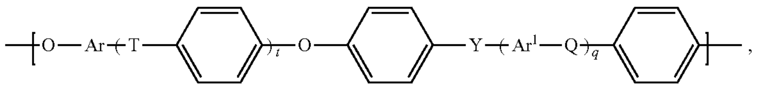

where t and q: are each independently 0, 1, 2 or 3,

Q, T and Y: are each independently a chemical bond or a group selected from —O—, —S—, —$SO_2$—, —(S═O)—, —(C═O)—, —N═N— and —$CR^aR^b$— wherein $R^a$ and $R^b$ are each independently a hydrogen atom or a C1-C12-alkyl, $C_1$-$C_{12}$-alkoxy or $C_6$-$C_{18}$-aryl group, and where at least one of Q, T and Y is —$SO_2$— and Ar, $Ar^1$: are each independently an arylene group having from 6 to 18 carbon atoms.

3. The membrane according to claim 2, wherein the non-sulfonated poly(arylene sulfone) polymer is a poly (ether sulfone) and comprises units of formula (lk)
(lk)
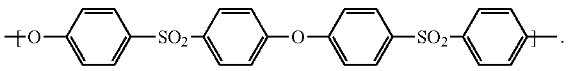
4. The membrane according to claim 1, wherein the membrane is a porous membrane.
5. The membrane according to claim 1, wherein the membrane is asymmetric.
* * * * *